United States Patent
Charny et al.

(10) Patent No.: US 8,384,912 B2
(45) Date of Patent: Feb. 26, 2013

(54) WIDE FIELD OF VIEW OPTICAL TRACKING SYSTEM

(75) Inventors: Adi Charny, Hod Hasharon (IL); Dror Yahav, Kfar Saba (IL); Shahaf Zommer, Ramat Yishai (IL); Ilan Efrat, Haifa (IL); Rani Ben-Yishai, Tel Aviv (IL)

(73) Assignee: Elbit Systems Ltd., Haifa (IL)

( * ) Notice: Subject to any disclaimer, the term of this patent is extended or adjusted under 35 U.S.C. 154(b) by 308 days.

(21) Appl. No.: 12/680,514

(22) PCT Filed: Sep. 18, 2008

(86) PCT No.: PCT/IL2008/001252
§ 371 (c)(1),
(2), (4) Date: Mar. 26, 2010

(87) PCT Pub. No.: WO2009/040792
PCT Pub. Date: Apr. 2, 2009

(65) Prior Publication Data
US 2011/0273722 A1    Nov. 10, 2011

Related U.S. Application Data

(60) Provisional application No. 60/975,325, filed on Sep. 26, 2007.

(51) Int. Cl.
*G01B 11/14* (2006.01)
(52) U.S. Cl. .......... 356/614; 356/615; 356/622
(58) Field of Classification Search .......... 356/614–624
See application file for complete search history.

(56) References Cited

U.S. PATENT DOCUMENTS

| | | | | |
|---|---|---|---|---|
| 3,678,283 A | * | 7/1972 | LaBaw | 250/216 |
| 3,867,629 A | * | 2/1975 | Van Buskirk | 250/225 |
| 4,314,761 A | * | 2/1982 | Reymond et al. | 356/141.5 |
| 4,576,481 A | * | 3/1986 | Hansen | 356/620 |
| 4,585,948 A | | 4/1986 | Schneider et al. | |
| 4,649,504 A | * | 3/1987 | Krouglicof et al. | 702/153 |
| 4,684,247 A | * | 8/1987 | Hammill, III | 356/152.2 |
| 4,684,249 A | * | 8/1987 | Ellis | 356/139.03 |
| 5,196,689 A | | 3/1993 | Sugita et al. | |
| 5,920,394 A | * | 7/1999 | Gelbart et al. | 356/615 |
| 6,697,147 B2 | * | 2/2004 | Ko et al. | 356/4.03 |
| 7,345,743 B1 | * | 3/2008 | Hartman et al. | 356/4.01 |
| 7,623,224 B2 | * | 11/2009 | Vogel | 356/141.5 |
| 2004/0061041 A1 | * | 4/2004 | Ben-Ari et al. | 250/203.1 |

FOREIGN PATENT DOCUMENTS

WO  WO 9746893  11/1997
WO  WO 2006/061819  6/2006

OTHER PUBLICATIONS

International Preliminary Report on Patentability issued for PCT/IL2008/001252 (8 pages).

* cited by examiner

*Primary Examiner* — Michael P Stafira
(74) *Attorney, Agent, or Firm* — Brown Rudnick LLP

(57) ABSTRACT

In an optical tracking system for determining the pose of a moving object in a reference coordinate system, the system including at least one light emitter, at least one optical detector for detecting the light emitted by the at least one light emitter and a pose processor, coupled with the at least one optical detector, and with the at least one light emitter, for determining the pose of the moving object according to the light detected by the at least one optical detector.

24 Claims, 10 Drawing Sheets

WIDE FIELD OF VIEW OPTICAL TRACKING SYSTEM

This is the United States National Stage of Patent Cooperation Treaty Application No. PCT/IL08/01252 filed Sep. 18, 2008, which claims priority to U.S. Patent Application No. 60/975,325 filed Sep. 26, 2007.

FIELD OF THE DISCLOSED TECHNIQUE

The disclosed technique relates to tracking systems, in general, and to a Wide Field Of View (WFOV) optical tracking system for determining the position and orientation of a moving object, in particular.

BACKGROUND OF THE DISCLOSED TECHNIQUE

Optical tracking systems for tracking the position and orientation of a moving object in a reference coordinate system are known in the art. These tracking devices employ optical detectors (e.g., Charge Coupled Devices) for gathering information about the position and/or orientation of a moving object. One configuration for such an optical tracking device is fixing one or several optical detectors on the moving object and fixing a set of light sources (e.g., Light Emitting Diodes) at a known position in the coordinate system. Another configuration for such an optical tracking device is fixing a set of light sources on the moving object and fixing one or several optical detectors at a known position in the reference coordinate system. Yet another configuration is combining the former configurations and fixing both detectors and light emitters on the moving object and at a known position in the reference coordinate system. Optical tracking systems enable automatic decision making based of the determined position and/or orientation. For example, a pilot may aim at a target by moving only her head toward the target (i.e., the pilot does not have to move the aircraft toward the target). The optical tracking system determines the orientation (i.e., elevation, azimuth and roll) of the helmet, worn by the pilot, in the aircraft coordinate system. As a further example, the optical tracking system may track the movements of a user of a virtual reality system (e.g., a game, a simulator) determining the position of the user.

However, an optical detector placed on the moving object can detect the light emitters in the reference coordinate system only as long as the light emitters are within the Field Of View (FOV) of the detector. Therefore, the FOV of the optical tracking system (i.e., the range of positions in which the optical tracking system tracks the moving object) is limited by the FOV of the optical detector. Similarly, the fixed light detector can track the moving object as long as the light emitters attached to the moving object are within the FOV of the fixed light detector. Thus, the intersection of the FOV of the moving light detector, with the FOV of the fixed light detector, defines the tracking space of the tracking system.

Reference is now made to FIG. 1, which is a schematic illustration of an optical detector, generally referenced 10, which is known in the art. Optical detector 10 includes an optical sensor 12 optically coupled with a lens 14. Lens 14 includes an entrance pupil 16. The FOV $\phi$ of optical detector 10 is inversely proportional to the ratio between the focal length f of lens 14 and the size d of optical sensor 12. Furthermore, the accuracy of optical detector 10 is proportional to the angular resolution thereof. Therefore, when the size of sensor 12 (e.g., number of pixels) is fixed, increasing the focal length of lens 14, increases the resolution but decreases the FOV of optical detector 10.

U.S. Pat. No. 3,678,283 issued to LaBaw, and entitled "Radiation Sensitive Optical Tracker", is directed to a system for determining the sight line of a pilot with respect to a point in a cockpit. The optical tracker includes: two detector assemblies and three light emitters. The first detector assembly is mounted on the helmet of the pilot. The first light emitter is mounted on the helmet of the pilot. The second detector assembly is mounted on the cockpit, at the point. The second and third light emitters are mounted on the cockpit, equally spaced on either side of the bore sight line in front of the pilot.

The detector assemblies include lateral photo detectors able to detect the lateral position of the light spot. The light emitters illuminate at a light frequency corresponding to the maximum sensitivity range of the detectors. The two light emitters mounted on the cockpit illuminate the detector mounted on the helmet. The illuminator mounted on the helmet illuminates the detector mounted on the cockpit. The determination of the azimuth and elevation angles, of the line of sight of the pilot, is irrespective of the helmet position within the cockpit. The amount of roll of the head of the pilot is computed by the output of the helmet mounted detector, which detects the two cockpit mounted light emitters.

U.S. Pat. No. 5,767,524 issued to Barbier et al., and entitled "Optical Device for Determining the Orientation of a Solid Body", is directed to a system for determining the orientation of a first solid body with respect to a second, solid body. The orientation determination system includes: three sets of optical source/detector. Each optical source/detector set includes an optical source and an optical radiation detector. At least one source/detector set is mounted on the first solid body. At least one source/detector set is mounted on the second solid body. On at least one of the solid bodies there are mounted two source/detector sets.

The orientation system determines in the first referential system, of the first solid body, two straight lines corresponding to the light radiation coming from the second referential system. The orientation system determines in the second referential system, of the second solid body, two straight lines corresponding to the light radiation coming from the first referential system. The knowledge of the orientation of at least two distinct straight lines in each of the referential systems gives, by computation of the rotation matrix, the three parameters of orientation of the first solid body with respect to the referential system of the second solid body.

SUMMARY OF THE PRESENT DISCLOSED TECHNIQUE

It is an object of the disclosed technique to provide a novel system determining the position and orientation of a moving object in a reference coordinate system.

In accordance with the disclosed technique, in an optical tracking system thus provided a Wide Field Of View (WFOV) optical detector, the WFOV optical detector. The optical tracking system tracks the pose of a moving object. The optical tracking system includes at least one light emitter, at least one optical detector for detecting the light emitted by the at least one light emitter and a pose processor. The pose processor is coupled with the at least one optical detector, and with the at least one light emitter. The pose processor determines the pose of the moving object according to the light detected by the at least one optical detector. One of the at least one optical detector and at least one light emitter is situated at a fixed position in the reference coordinate system, and the other of the at least one optical detector and at least one light emitter is attached to the moving object. The WFOV optical detector comprises an optical sensor and at least two optical receptors optically coupled with the optical sensor. The optical sensor senses light received from at least one of the at least one light emitter. The optical receptors are spatially spaced apart from each other. Each of the optical receptors projects a different angular section of an observed scene on the optical sensor. The pose processor associates at least one representation of the at least one light emitter on the optical sensor, with a respective one optical receptors which projects the light received from the at least one light emitter on said optical sensor, according the response of the optical sensor.

In accordance with another embodiment of the disclosed technique, there is thus provided an optical tracking system for determining the pose of a moving object in a reference coordinate system. The optical tracking system includes at least one light emitter, at least one WFOV optical detector and a pose processor. The WFOV optical detector includes an optical sensor and at least two optical receptors optically coupled with the optical sensor. The optical sensor senses light received from at least one of the at least one light emitter. The optical receptors are spatially spaced apart from each other. Each of the optical receptors projects a different angular section of an observed scene on the optical sensor. The pose processor is coupled with the at least one optical detector and with the at least one light emitter. The pose processor associates at least one representation of the at least one light emitter on the optical sensor, with a respective one optical receptors projecting the light received from the at least one light emitter on the optical sensor, according the response of the optical sensor. One of the at least one optical detector and at least one light emitter is situated at a fixed position in the reference coordinate system, and the other of the at least one optical detector and at least one light emitter is attached to the moving object.

In accordance with a further embodiment of the disclosed technique, there is thus provided an optical tracking system for determining the orientation of a moving object in a reference coordinate system. The system includes a moving optical detector, a reference optical detector, at least one moving light emitter, at least one reference light emitter, an orientation processor. The moving optical detector is attached to the moving object. The reference optical detector is situated at a fixed position in the reference coordinate system. The at least one moving light emitter is attached to the moving object and emits light from the entrance pupil of the moving optical detector. The reference light emitter is situated at a fixed position in the reference coordinate system and emits light from the entrance pupil of said reference optical detector. The orientation processor is coupled with the moving light emitter, the moving optical detector, the fixed light emitter and with the fixed optical detector. The orientation processor determines an orientation angle of the moving object by subtracting a first angle from a second angle thereby determining the orientation angle of the moving object in the reference coordinate system.

In accordance with another embodiment of the disclosed technique, there is thus provided an optical tracking system for determining the orientation of a moving object in a reference coordinate system. The system includes a reflective surface, a optical detector, at least one light emitter and an orientation processor. The reflective surface is fixed in the reference coordinate system. The optical detector is attached to said moving object. The at least one light emitter is attached to said moving object. The optical detector detects light reflected from said reflective surface. The orientation processor is coupled with the optical detector and with the at least one light emitter. The orientation processor determines the orientation of said moving object in said reference coordinate system according to the light incident on said optical detector.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

The disclosed technique overcomes the disadvantages of the prior art by providing an optical tracking system for determining the pose of a moving object including a moving optical detector and a reference optical detector. The term "pose" relates hereinafter to the position (i.e., the x, y and z coordinates) and the orientation (i.e., azimuth elevation and roll angles). According to one embodiment of the disclosed technique, the moving optical detector exhibits a novel configuration, for increasing the FOV thereof, without increasing the size of the optical sensor or decreasing the focal length of the optical receptor (i.e., which decreases the accuracy of the tracking system). According to another embodiment of the disclosed technique, the spatial setup of the light emitters and the detectors enables the optical tracking system to determine the orientation of a moving object (e.g., a helmet), in a reference coordinate system (e.g., the coordinate system of an aircraft), without determining the position of the moving object. According to a further embodiment of the disclosed technique, a reflective surface replaces the reference detector, and also enables the optical tracking system to determine the orientation of a moving object, in a reference coordinate system, without determining the position of the object.

As mentioned above an optical detector, placed on a moving object, can detect light emitters that are situated within the FOV of that optical detector. Therefore, increasing the FOV of the optical detector increases the tracking range of the tracking system. In order to increase the FOV of the optical detector a plurality of optical receptors (e.g., lenses or pinholes or both) are placed over an optical sensor. Additionally, the optical axes of the optical receptors may be unparallel with respect to each other. Thus, the field of view of the detector is increased (i.e., relative to the FOV of a single optical receptor). Furthermore, the focal length of each optical receptor may be different. It is noted that the WFOV optical detector according to the disclosed technique, resolves objects in the WFOV thereof, when the angular span of these objects is substantially small (i.e., point like objects), such that the images of the object, formed on the optical sensor by the various lenses, do not overlap with each other.

Figure 1:
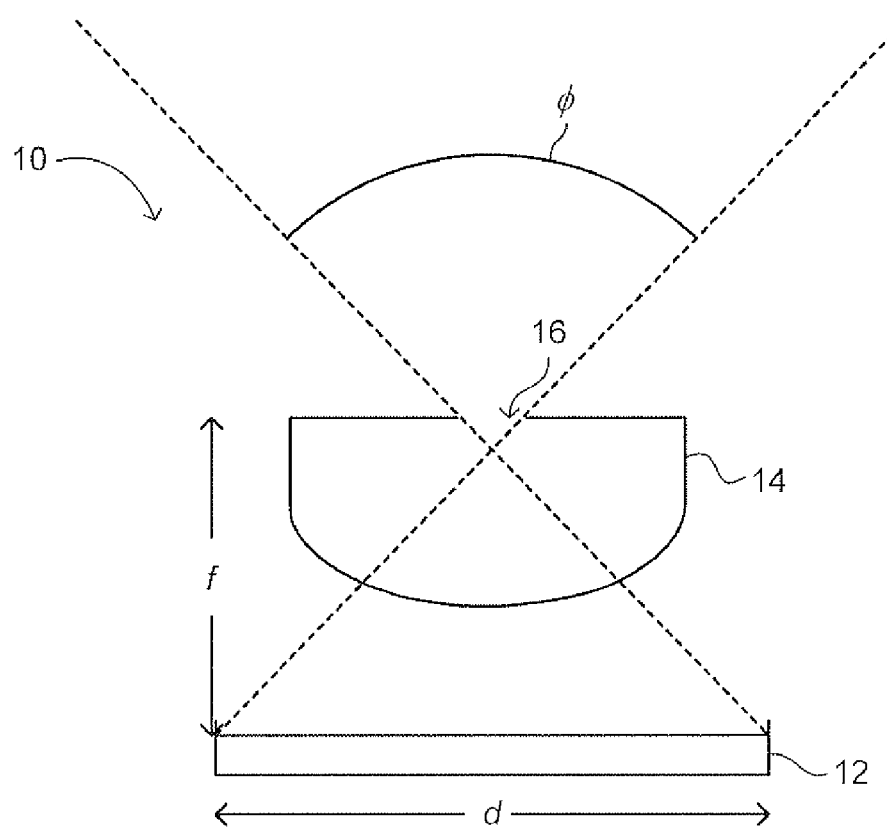
FIG. 1 is a schematic illustration of an optical detector, generally referenced 10, which is known in the art.
Figure 2A:
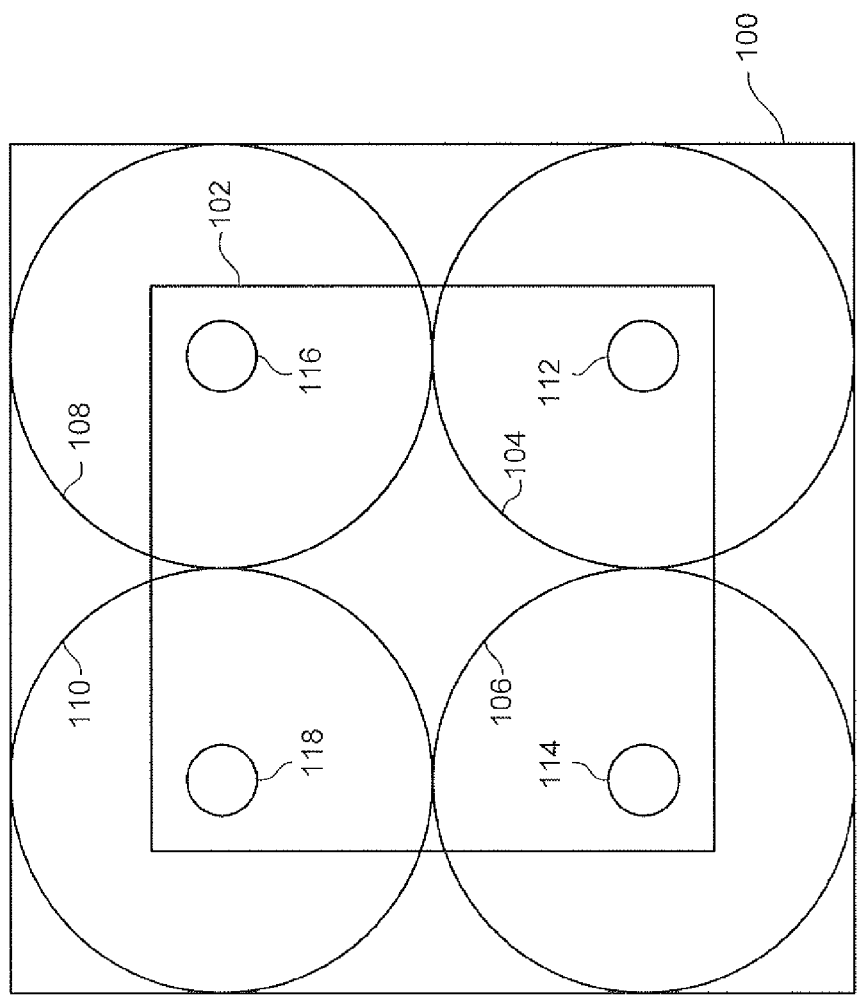
FIGS. 2A and 2B are schematic illustrations of a WFOV optical detector assembly, generally referenced 100, constructed and operative in accordance with an embodiment of the disclosed technique.
Figure 2B:
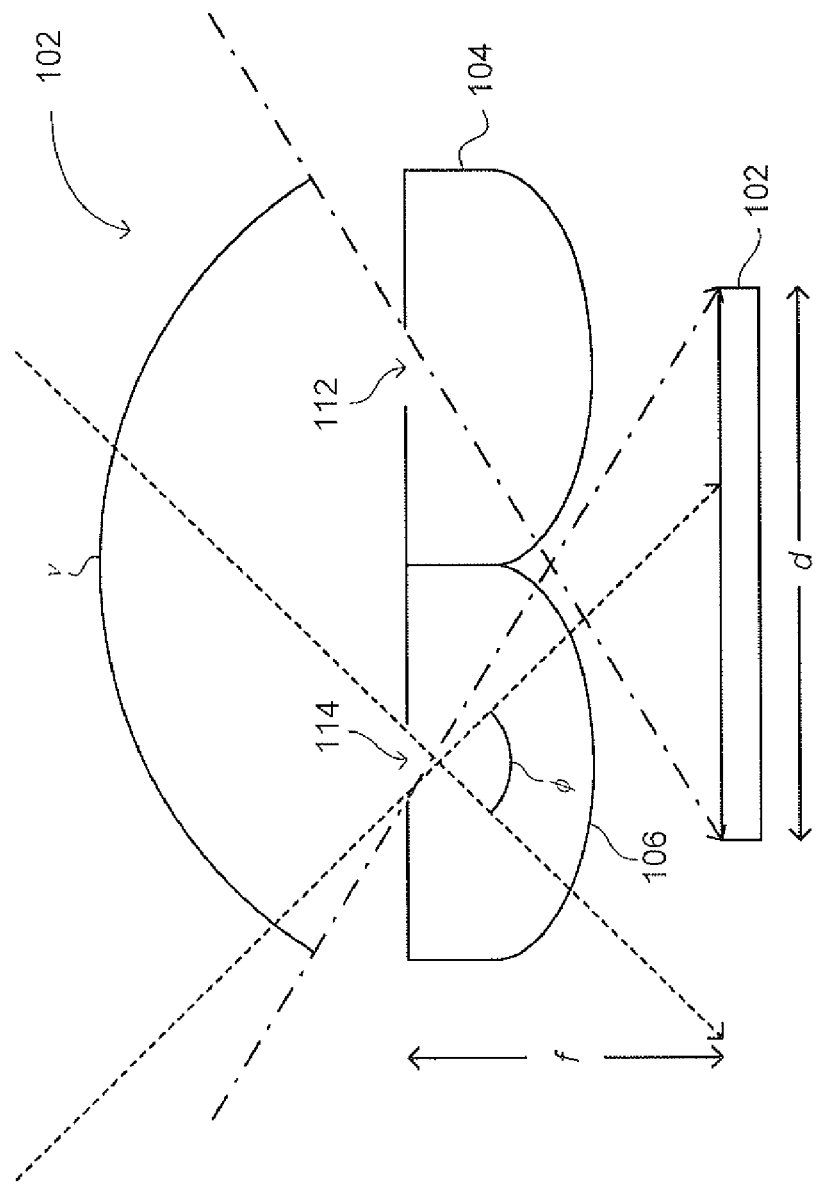

Reference is now made to FIGS. 2A and 2B, which are schematic illustrations of a WFOV optical detector assembly, generally referenced 100, constructed and operative in accordance with an embodiment of the disclosed technique. FIG. 2B is a side view of optical detector assembly 100. Optical detector assembly 100 includes an optical sensor 102 and optical receptors 104, 106, 108 and 110. Optical receptors 104, 106, 108 and 110 are spaced apart from each other. Each one of optical receptors 104, 106, 108 and 110 includes an entrance pupil. Optical receptor 104 includes an entrance pupil 112, optical receptor 106 includes an entrance pupil 114, optical receptor 108 includes an entrance pupil 116 and optical receptor 110 includes an entrance pupil 118. Optical receptors 104, 106, 108 and 110 may be optical lenses. Alternatively, Optical receptors 104, 106, 108 and 110 may be pinholes.

Optical receptors 104, 106, 108 and 110 are optically coupled with optical sensor 102. Optical sensor 102 is, for example, a CCD detector, a Complementary Metal Oxide Semiconductor (CMOS) sensor, a Position Sensitive Device (PSD) or a lateral photo-detector. Optical receptors 104, 106, 108 and 110 are arranged such that each element projects different angular sections of the observed scene (not shown) on the same area of optical sensor 102. The FOV ν (FIG. 2B), of optical detector assembly 100 is greater then FOV φ (FIG. 2B) of a single optical receptor such as optical receptor 106. Thus, the FOV of optical detector assembly 100 is increased (i.e., relative to the FOV of a single element) without increasing the size d (FIG. 2B) of optical detector 100 or decreasing the focal length f (FIG. 2B) of optical detector assembly 100.

To increase the resolution at the center of the FOV of the optical detector, an additional optical receptor, with a larger focal length, is placed above the optical receptors. Furthermore, to increase the FOV of the optical detector the bottom optical receptors are tilted, relative to one another, such that the optical axes thereof are unparallel.

Optical detector 100 exhibits a unique response to the direction of light incident thereupon. The position of the light incident on optical sensor 102 is related to the direction from which light enters each of entrance pupils 112, 114, 116 and 118. The unique response of the optical detector to the direction of light incident thereupon is referred to herein as the "directional response". For example, when the optical sensor 102 is a CCD sensor, each pixel in the CCD is associated with an angular step. When the optical sensor is a lateral photo-detector, the current differences at the terminals of the detector are related to the angle of light incident on the lateral photo-detector.

Figure 3A:
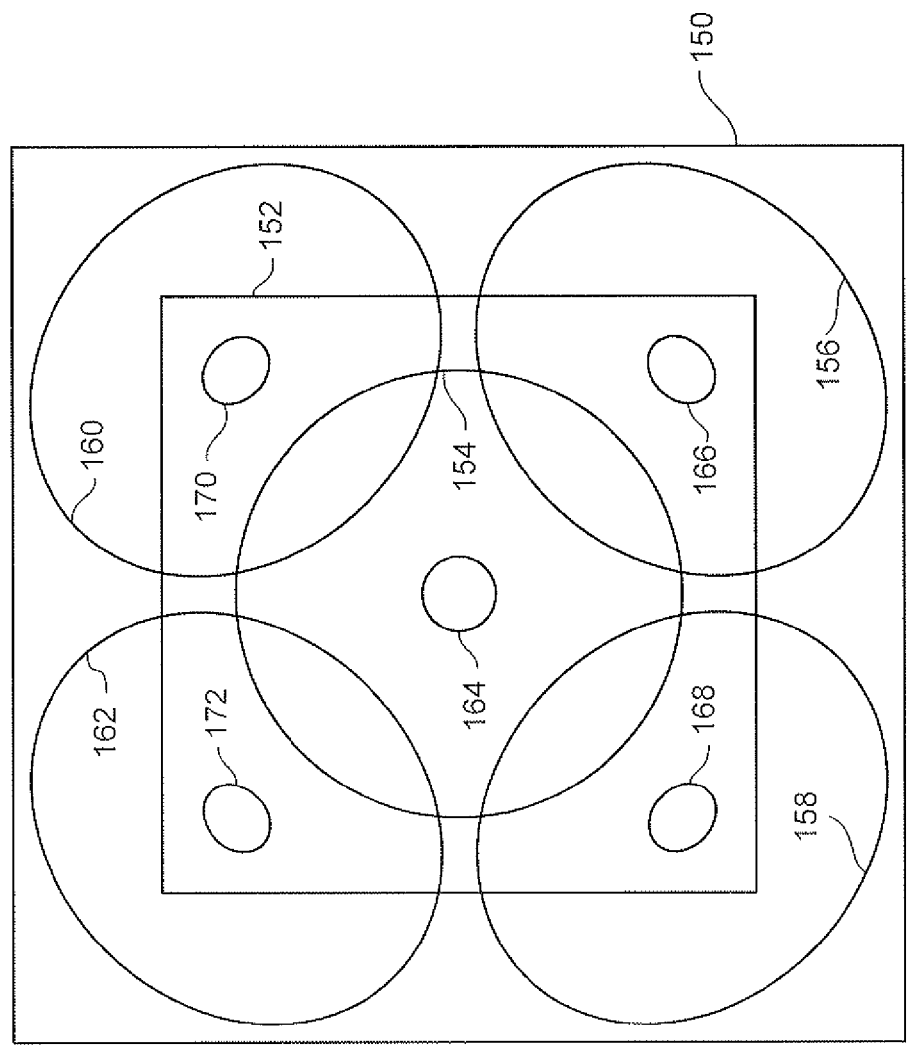
FIGS. 3A and 3B are schematic illustrations of WFOV optical detector assembly, generally referenced 150, constructed and operative in accordance with another embodiment of the disclosed technique.
Figure 3B:
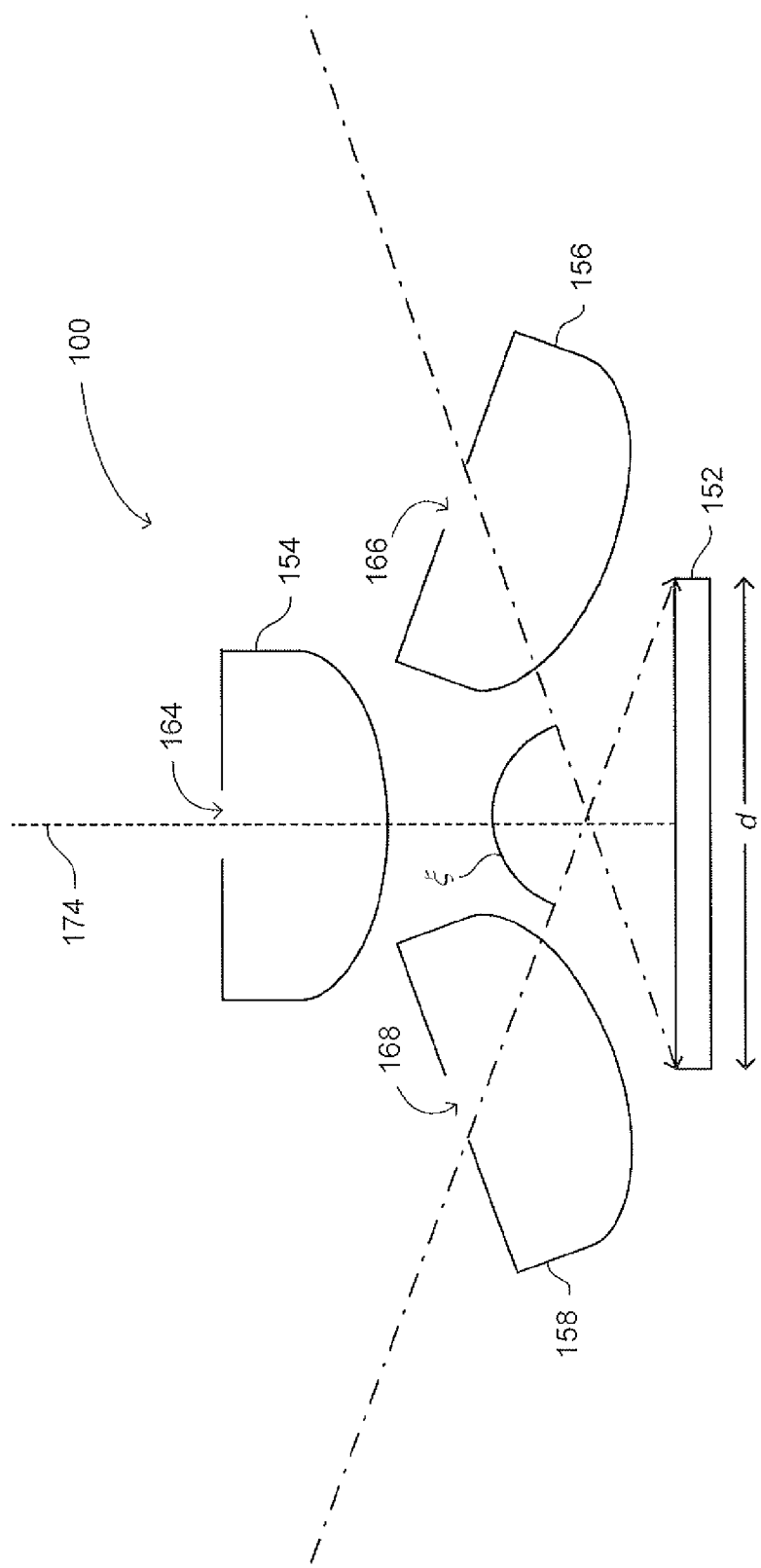

Reference is now made to FIGS. 3A and 3B, which are schematic illustrations of WFOV optical detector assembly, generally referenced 150, constructed and operative in accordance with another embodiment of the disclosed technique. FIG. 3B is a side view of optical detector assembly 150. Optical detector assembly 150 includes an optical sensor 152 and optical receptors 154, 156, 158, 160 and 162. Optical receptors 154, 156, 158, 160 and 162 are spaced apart from each other. Each one of optical receptors 154, 156, 158, 160 and 162 includes an entrance pupil and a lens. Optical receptor 154 includes an entrance pupil 164, optical receptor 156 includes an entrance pupil 166, optical receptor 158 includes an entrance pupil 168, optical receptor 160 includes an entrance pupil 170 and optical receptor 162 includes an entrance pupil 172.

Optical receptors 154, 156, 158, 160 and 162 are optically coupled with optical sensor 152. The FOV (FIG. 3B), of optical detector assembly 150 is increased relative to the FOV of a single optical receptor (e.g., optical receptor 106 in FIG. 2B) without changing the size d of optical sensor 152 or the focal lengths of the lenses. As mentioned above optical receptors 154, 156, 158, 160 and 162 may be optical lenses. Alternatively, optical receptors 154, 156, 158, 160 and 162 may be replaced with pinholes. Optical detector 150 exhibits a directional response.

Figure 4:
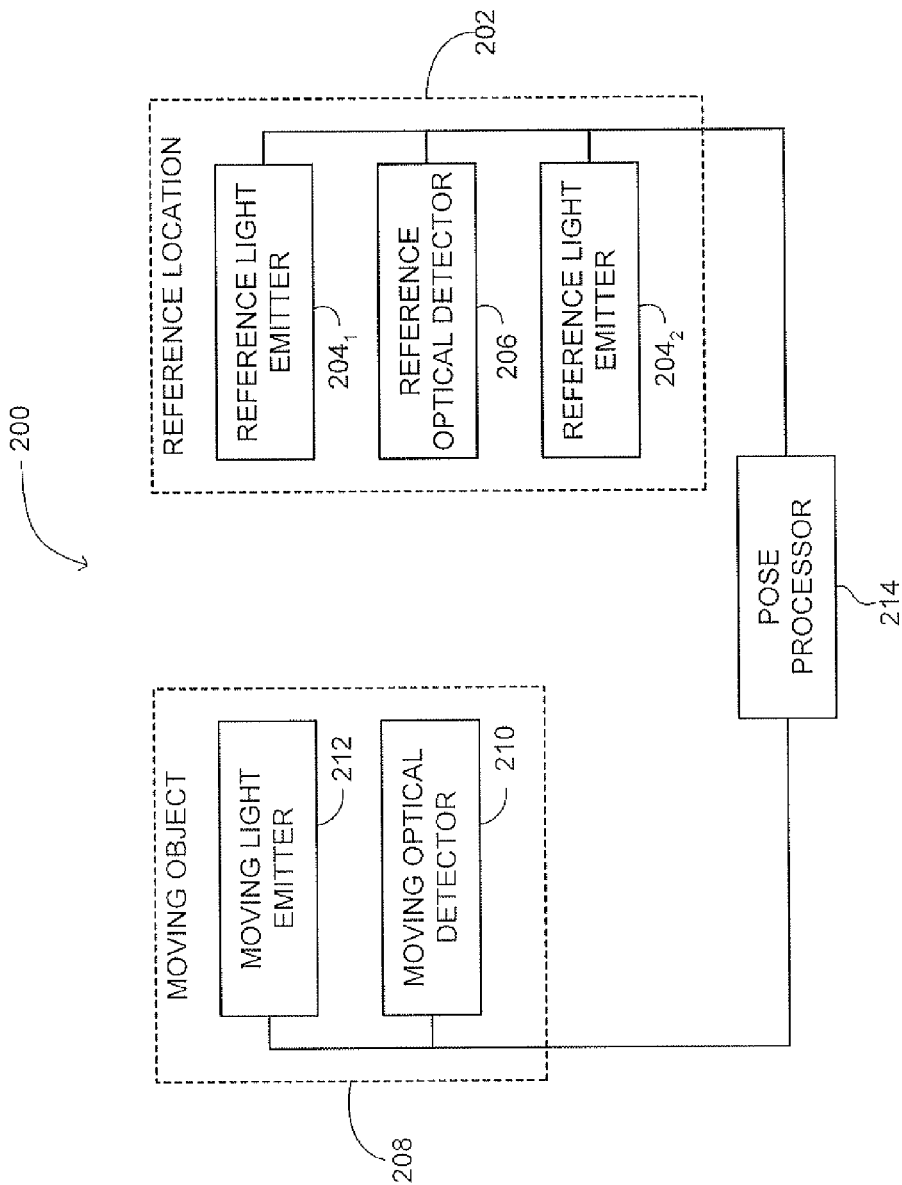
FIG. 4 is a schematic illustration of an optical tracking system, generally referenced 200, for determining the pose (i.e., position and orientation) of a moving object 208 in a reference coordinate system in accordance with a further embodiment of the disclosed technique.
Figure 5C:
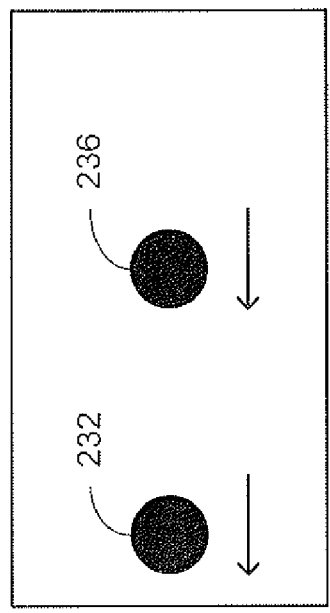
FIGS. 5A, 5B, 5C and 5D are schematic illustrations of images of a single light emitter acquired by a WFOV optical detector which includes only two adjacent optical receptors.
Figure 5D:
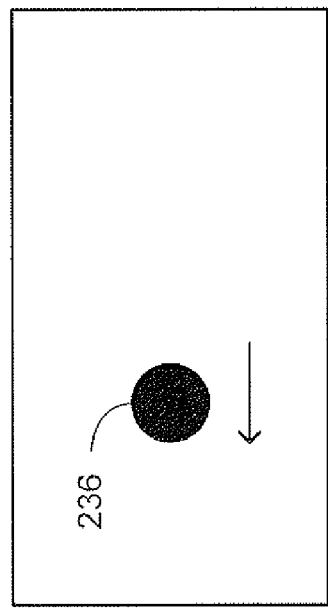
Figure 5A:
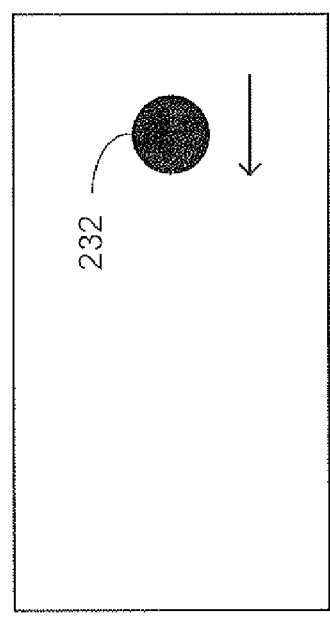
Figure 5B:
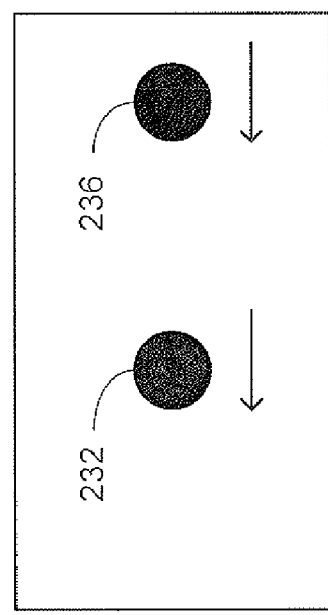

Reference is now made to FIG. 4, which is a schematic illustration of an optical tracking system, generally referenced 200, for determining the pose (i.e., position and orientation) of a moving object 208 in a reference coordinate system in accordance with a further embodiment of the disclosed technique. System 200 includes a reference optical detector 206, reference light emitters $204_1$ and $204_2$, moving optical detector 210, a moving light emitter 212 and a pose processor 214. Either one of reference optical detector 206 or moving optical detector 210 may be a WFOV optical detector as described hereinabove in conjunction with FIGS. 2A and 2B or FIGS. 3A and 3B. Pose processor 214 is coupled with reference optical detector 206, with reference light emitters $204_1$ and $204_2$, with moving optical detector 210 and moving light emitter 212. Reference optical detector 206 and reference light emitters $204_1$ and $204_2$ are situated at a known position 202 in a reference coordinate system (not shown). Moving optical detector 210 and moving light emitter 212 are attached to moving object 208. Moving light emitter 212 and reference light emitters $204_1$ and $204_2$ are, for example, Light Emitting Diodes (LEDs) emitting light at a desired spectral range (e.g., visible light, infrared). Each of reference optical detector 206 and moving optical detector 210 exhibit a directional response. Each of reference optical detector 206 and moving optical detector 210 include an optical sensor (not shown). The optical sensors are, for example, Charge Coupled Devices (CCDs), Complementary Metal Oxide Semiconductor (CMOS) sensor, a Position Sensitive Device (PSD) or a lateral photo-detector.

Reference optical detector 206 acquires an image of moving light emitter 212. Moving optical detector 210 acquires an image of reference light emitters $204_1$ and $204_2$. Pose processor 214 determines the pose of moving object 208 relative to the reference coordinate system according to the response of reference optical detector 206 and moving optical detector 210 to the acquired images of light emitters $204_1$ and $204_2$ and moving light emitter 212.

It is noted that system 200 can determine the pose of moving object 208 as long as reference light emitters $204_1$ and $204_2$ are within the FOV ν of moving optical detector 210 and as long as moving light emitter 212 is within the FOV of reference optical detector 206. It is further noted that when moving optical detector 210 is a WFOV optical detector, each optical receptor projects a respective representation of light emitters 204₁ and 204₂ on the optical sensor of moving optical detector 210. Pose processor 214 associates each one of these representations with a respective one optical receptor, according to the position of the representation on the optical sensor.

Pose processor 214 associates the representations of light emitters 204₁ and 204₂ with the respective optical receptor, projecting these representations on the optical sensor, by tracking the representations on the optical sensor (i.e., after the representation of light emitters 204₁ and 204₂ where associated with a respective optical receptor at least once). Alternatively, pose processor 214 associates the representations of light emitters 204₁ and 204₂ with the respective optical receptor, projecting these representations on the optical sensor, by determining a figure of merit for each representation (e.g., according to the orientation resulting from each representation). Pose processor 214 selects the optical receptor with the higher figure of merit. In yet another alternative, when light emitters 204₁ and 204₂ are in the FOV of all the optical receptors of moving optical detector 210, pose processor 214 associates the representations of light emitters 204₁ and 204₂ with the respective optical receptors according to the geometric configuration of the optical receptors.

Reference is now made to FIGS. 5A, 5B, 5C and 5D which are schematic illustrations of images of a single light emitter acquired by a WFOV optical detector which includes only two adjacent optical receptors (not shown). In FIGS. 5A, 5B, 5C and 5D the WFOV optical detector moves from left to right relative to the light emitter. Consequently, emitter representation 232 and 236 of the light emitter (not shown), in images 230, 234, 238 and 240, move from right to left (i.e., relative to the image vertical axis), as designated by the arrow. In image 230 (FIG. 5A), emitter representation 232 represents the light received from the light emitter and received by the first optical receptor. In images 234 and 238 (FIGS. 5B and 5C), emitter representations 232 and 236 represent the light received from the light emitter and received by both the optical receptors. In image 240 (FIG. 5D), emitter representation 236 represents the light received from the light emitter and received by the second optical receptor. Thus, by tracking the representations of the light emitter, a pose processor (e.g., pose processor 214 in FIG. 4) determines which optical receptor in the WFOV optical detector projects the light received from a light emitter. During initialization of the system or when the optical tracking system loses track of the moving object, the optical tracking system has no information relating to which one of the optical receptors projects light on the optical sensor. Therefore, the system computes a figure of merit for the orientation resulting by considering each representation and selects the optical receptor with the higher figure of merit.

According to another embodiment of the disclosed technique, the spatial setup of the light emitters and the detectors enables the optical tracking system to determine the orientation of a moving object, in a reference coordinate system, without determining the position of the object. According to this spatial setup, a light emitter is placed at the entrance pupil of each optical receptor and emits light therefrom. Alternatively, a virtual representation of the light emitter can be created at the entrance pupil of the optical receptor (e.g., using beam splitters situated in front of the entrance pupil of the optical receptor). Consequently, the light emitter is perceived as emitting light from the entrance pupil of the optical receptor. In yet another alternative, two light emitters are placed such that the optical center of gravity thereof (e.g., the average position vector, in the reference coordinate system, of the two light emitters) is located at the entrance pupil of the optical receptor. Referring back to FIG. 4, a virtual representation (not shown) of light emitter 212 is formed at the entrance pupils of the optical receptors of moving optical detector 210. Reference light emitters 204₁ and 204₂ are positioned such that the optical center of gravity thereof is located at the entrance pupil of the optical receptor of reference optical detector 206. Consequently orientation processor determines the orientation of moving object 208 without determining the position thereof.

Figure 6:
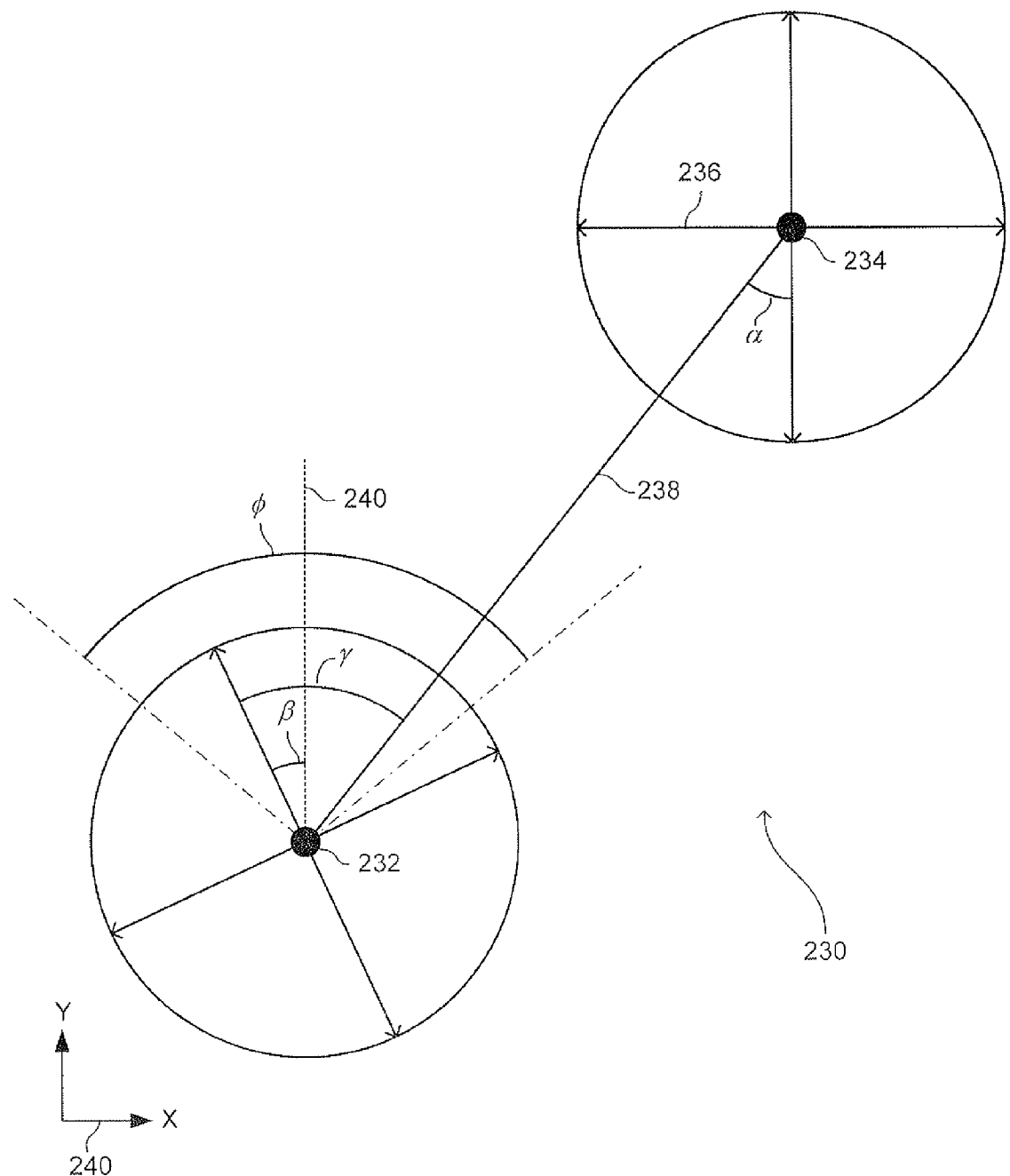
FIG. 6 is an example for determining the horizontal orientation of a moving object without determining the position thereof in accordance with another embodiment of the disclosed technique.

Reference is now made to FIG. 6 which is an example for determining the horizontal orientation of a moving object without determining the position thereof in accordance with another embodiment of the disclosed technique and still referring back to FIG. 4. It is noted that in exemplary FIG. 6, the position of moving object 208 changes in the X, Y plane of two-dimensional (2D) coordinate system 240, and the orientation of moving object 208 may change only horizontally. It is further noted that the example brought herein is operative in either one of two cases. In the first case the light emitters emit light from the entrance pupil of the optical receptor of the optical detector. In the second case at least two light emitters are situated such the optical center of gravity thereof is located at the pupil of the optical detector. It is also noted that the roll angle is assumed to be zero.

Pose processor 214 determines the angle α, between the longitudinal axis 240 of reference coordinate system 236 and line 238 connecting entrance pupil 232 and entrance pupil 234 of moving optical detector 206 and reference optical detector 210 respectively. Pose processor 214 determines this angle α according to the location of a representation of moving light emitter 212 in an image acquired by reference optical detector 206. For example, when the optical sensor of reference optical detector 206 is a CCD sensor, each pixel in the CCD is associated with an angular step. Thus, angle α is that angular step multiplied by the number of horizontal pixels counted from the optical center of the CCD. It is noted that moving light emitter 212 emits light from the entrance pupil of the optical receptor of moving optical detector 210 (e.g., via a beam splitter).

Pose processor 214 determines the angle γ, between the optical axis of the moving optical detector 210 and Line 238 connecting entrance pupil 232 and entrance pupil 234. Pose processor 214 determines the angle γ according to the location of the representations of reference light emitters 204₁ and 204₂ on an image acquired by moving optical detector 210. The optical center of gravity of reference light emitters 204₁ and 204₂ is situated at the entrance pupil of the optical receptor of reference optical detector 206.

Pose processor 214 determines the horizontal orientation of moving object 208 by determine the angle between optical axis of the moving optical detector 210 and longitudinal axis 240, designated by the angle β. Orientation processor determines the angle β according to:

$$\beta = \gamma - \alpha \qquad (1)$$

Thus, according to the example brought hereinabove, orientation processor 214 determines the horizontal orientation angle of moving object 208 without determining the position thereof.

As mentioned above, the exemplary method described in conjunction with FIG. 6 is operative when the light emitters emit light from the entrance pupil of the optical receptor and the roll angle is zero. The method may also be operative when the roll angle is substantially small, resulting in an approximation of the azimuth and elevation angles. Alternatively, the method described in conjunction with FIG. 6 is operative in situations wherein the roll angle is known. For example, the two light emitters are situated such that the optical center of gravity thereof is located at that entrance pupil (i.e., the roll angle is known according to the representations of the two light emitters on the opposite optical sensor). In yet another example, the roll angle is known from gravitational tilt sensors. For the exemplary method of FIG. 6 to be operative with the WFOV optical detector described in conjunction with FIGS. 2A, 2B, 3A and 3B, a light emitter is associated with a respective one entrance pupil described therein, and emits light therefrom. Alternatively, at least a pair of light emitters is associated with a respective one entrance pupil and the optical center of gravity thereof is located at that respective entrance pupil. Furthermore, when light is determined as entering through an entrance pupil or pupils, associated with the light emitter or light emitters, the optical tracking system relates to the light emitted by this light emitter or these light emitters (e.g., by selecting the representation of the light emitter or emitters on the opposite optical detector or by enabling these light emitters).

The method described in conjunction with FIG. 6 may be applied when moving object 208 moves in three-dimensions (3D). Accordingly, the orientation of moving object 208 may change in the horizontal, vertical and roll directions. Equation (1) may be applied in both the horizontal and vertical cases. The results of equation (1) are a horizontal orientation angle and a vertical orientation angle. The azimuth and elevation are approximated according to the horizontal orientation, vertical orientation and roll angles. The roll angle may be determined, for example, as mentioned above, according to the representations of the two light emitters on the opposite optical sensor.

According to a further embodiment of the disclosed technique, a reflective surface replaces the reference detector. Thus, the optical tracking system determines the orientation of a moving object, in a reference coordinate system, without determining the position of the moving object. According to this configuration, the optical tracking system includes a light emitter attached to the moving object and a reflective surface situated at a known position in the reference coordinate system. A reflection of the moving light emitter is formed on the fixed reflective surface. When the roll angle is substantially small, the reflection of the moving light emitter is affected only by the change in the azimuth and the elevation angles of the moving object (i.e., yaw and pitch), and not by the translation of the moving object (i.e., there is no parallax). Consequently, the optical tracking system determines the two angle orientation of the moving object according to an image of the reflection of the moving light emitter, acquired by moving light detector. For determining the roll angle (i.e., when accurate values of the azimuth and elevation angles are required), the reflective surface may include additional emitters at the vicinity thereof.

Figure 7:
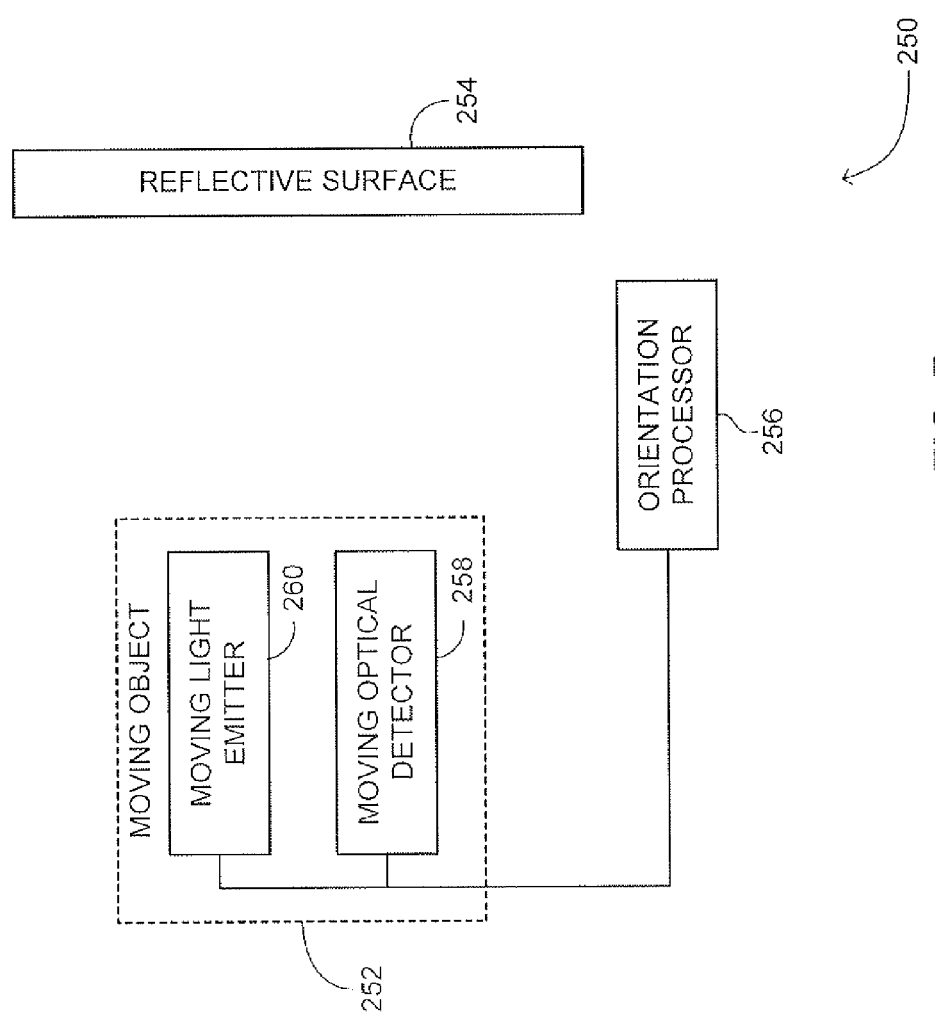
FIG. 7 is a schematic illustration of an optical tracking system, generally reference 250, constructed and operative in accordance with a further embodiment of the disclosed technique.

Reference is now made to FIG. 7, which is a schematic illustration of an optical tracking system, generally reference 250, constructed and operative in accordance with a further embodiment of the disclosed technique. System 250 includes a moving object 252, a reflective surface 254 and an orientation processor 256. Moving object 252 includes a moving optical detector 258 and light emitter 260. Moving optical detector 258 may be a WFOV optical detector as described hereinabove in conjunction with FIGS. 2A and 2B or FIGS. 3A and 3B. Moving optical detector 258 and light emitter 260 are all coupled with orientation processor 256. Light emitter 260 emits light toward reflective surface 254. Reflective surface 254 reflects the light back toward moving WFOV optical detector 258. Reflective surface 254 is, for example, a flat mirror. Reflective surface 254 may further be any surface reflecting the light emitted by Light emitter 260 such as a computer screen, a television screen, a vehicle or aircraft windshield and the like. Reflective surface 254 may be a wavelength selective reflective surface (i.e., reflective surface 254 reflects radiation within a range of wavelengths only). Moving optical detector 258 acquires an image of the reflection of moving light emitter 260. Orientation processor 256 determines the orientation of moving object 252 according to the acquired image of the reflection of light emitter 260. Orientation processor 256 determines the azimuth and elevation angles of the moving object according to the (x, y) location of the light emitter in the image (i.e., when the roll angle is substantially small). However, system 250 described hereinabove in conjunction with FIG. 7, determines the azimuth and elevation angles only. When system 250 is required to determine the roll angle as well, two additional light emitters are fixed, for example, at either side of reflective surface 254. System 250 determines the roll angle according to the position of the two light emitters in the image. Alternatively, a single light emitter of a shape exhibiting rotational asymmetry around an axis normal to the object plane (i.e., where the light emitter is located), within a desired range of roll angles (e.g., an ellipse, an isosceles triangle) is fixed at the vicinity of the reflective surface.

Figure 8:
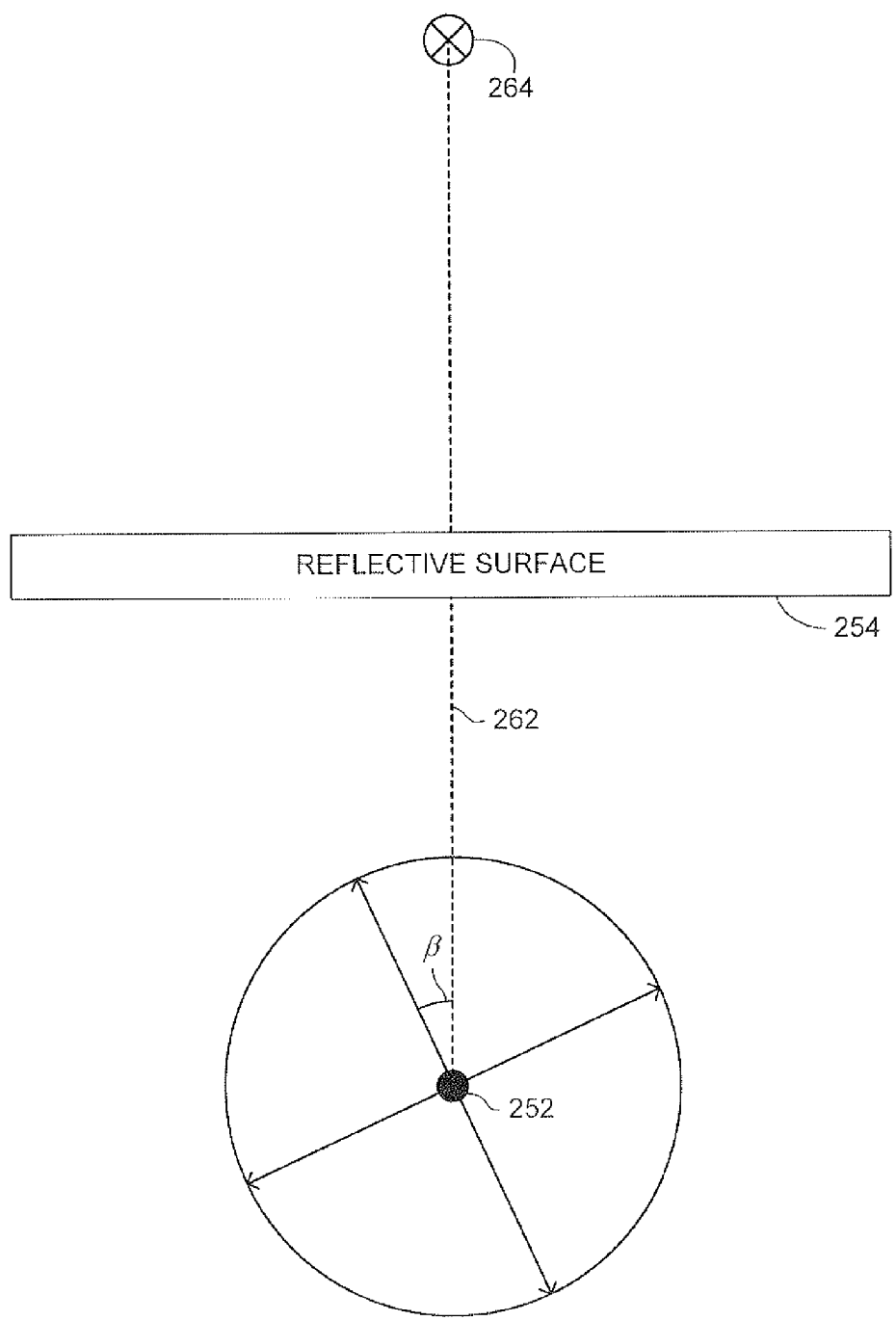
FIG. 8 is a schematic illustration of a two-dimensional example for determining the orientation of a moving object without determining the position thereof in accordance with another embodiment of the disclosed technique.

Reference is now made to FIG. 8, which is a schematic illustration of a two-dimensional example for determining the orientation of a moving object without determining the position thereof in accordance with another embodiment of the disclosed technique and referring back to FIG. 6. Orientation processor 256 determines the orientation of moving object 252, designated by the angle $\beta$, by determining in which angular section of the observed scene mirror image 264 of moving light emitter 260 is situated (i.e., by tracking light incident on the sensor of moving optical detector 258). Orientation processor 256 determines the angle $\beta$ further, according to the location of the projection of mirror image 264 of moving light emitter 260 on moving optical detector 258. As in the example brought hereinabove, when the optical sensor of moving optical detector 258 is a CCD sensor, each pixel in the CCD is associated with an angular step. Thus angle $\beta$ is that angular step multiplied by the number of pixels counted from the optical center of the CCD sensor. As mentioned above, the angle $\beta$ is determined when the roll angle is substantially small.

It will be appreciated by persons skilled in the art that the disclosed technique is not limited to what has been particularly shown and described hereinabove. Rather the scope of the disclosed technique is defined only by the claims, which follow.

The invention claimed is:

1. An optical tracking system for determining the pose of a moving object in a reference coordinate system, the system comprising:
   at least one light emitter attached to said moving object;
   at least one other light emitter situated in a fixed position in a reference coordinate system;
   at least one Wide Field Of View (WFOV) first optical detector attached to said moving object, said WFOV optical detector including
      an optical sensor for sensing light received from at least one of said at least one light emitter, and
      at least two optical receptors optically coupled with said optical sensor, each of said optical receptors including an entrance pupil, said optical receptors being spatially spaced apart from each other, each of said optical receptors projecting a different angular section of an observed scene on said optical sensor;

a second optical detector situated at said fixed position in said reference coordinate system; and a pose processor coupled with said first optical detector, with said second optical detector, with said at least one light emitter attached to said moving object, and with said at least one light emitter situated at said fixed position, for associating at least one representation of one of said at least one two light emitters situated at a fixed position on an image acquired by said optical sensor, with a respective one optical receptors projecting the light received from said one of said at least one two light emitters situated at a fixed position, on said optical sensor, according to the position of said representation on said image.

2. The WFOV optical detector according to claim 1, wherein the optical axes of said at least two optical receptors are unparallel with respect to each other.

3. The WFOV optical detector according to claim 1, wherein each of said at least two optical receptors has a different focal length, and wherein each of said at least two optical receptors is one of an optical lens and a pinhole receptor.

4. The system according to claim 1, wherein said second optical detector is a WFOV optical detector including:
  an optical sensor, for sensing light received from said at least one light emitter; and
  at least two optical receptors, optically coupled with said optical sensor, each of said optical receptors including an entrance pupil, said optical receptors being spatially space apart from each other, each of said optical receptors projecting a different angular section of an observed scene on said optical sensor.

5. The system according to claim 1, wherein at least two light emitters are attached to said moving object.

6. The system according to claim 1, wherein said at least one light emitter attached to said moving object is of a shape exhibiting rotational asymmetry around an axis normal to the object plane of said light emitter, within a desired range of angles.

7. The system according to claim 1, wherein said at least two light emitters are situated in a fixed position in the reference coordinate system.

8. The system according to claim 1, wherein said at least one light emitter situated in a fixed position is of a shape exhibiting rotational asymmetry around an axis normal to the object plane of said light emitter, within a desired range of angles.

9. The system according to claim 1, wherein said pose processor associates said at least one representation with a respective one optical receptor by tracking said representations.

10. The system according to claim 1, said pose processor associates said at least one representation with a respective one optical receptor by determining a figure of merit for each one of said at least one representation and selecting the representation with the higher figure of merit.

11. The system according to claim 1, wherein said pose processor associates each one of said representations, with a corresponding optical receptor, according to the geometric configuration of said at least two optical receptors.

12. The system according to claim 1, wherein said optical sensor is selected from the group consisting of: a charge coupled device; a complementary metal oxide semiconductor sensor; a position sensitive device; and a lateral photo-detector.

13. The system according to claim 1, wherein said orientation processor determines an orientation angle of said moving object by subtracting a first angle from a second angle thereby determining said orientation angle of said moving object in said reference coordinate system.

14. The system according to claim 13, wherein said orientation angle is the horizontal orientation angle, and wherein an azimuth orientation angle is approximated according to said horizontal orientation angle.

15. The system according to claim 13, wherein said orientation angle is a vertical orientation angle, and wherein an elevation orientation angle is approximated according to said vertical orientation angle.

16. The system according to claim 13, wherein said first angle is determined according to the directional response of said optical detector situated at a fixed position, to an acquired image of said at least one light emitter attached to said moving object, and wherein said second angle is determined according to the directional response of said optical detector attached to said moving object to an acquired image of said at least one light emitter situated at a fixed position.

17. The system according to claim 7, wherein the optical center of gravity of said at least two light emitters situated at a fixed position is located at the entrance pupil of said second optical detector situated at a fixed position, and wherein said pose processor determines the roll angle according to the position of the representations of said at least two light emitters situated at a fixed position on an image acquired by said optical detector attached to said moving object.

18. The system according to claim 5, wherein the optical center of gravity of said at least two light emitters attached to said moving object is located at the entrance pupil of said WFOV first optical detector attached to said moving object, and wherein said pose processor determines the roll angle according to the position of the representations said at least two light emitters attached to said moving object on an image acquired by said second optical detector situated at a fixed position.

19. The system according to claim 1, wherein said at least one light emitter attached to said moving object and at least two reference light emitters situated in a fixed position are Light Emitting Diodes.

20. The system according to claim 1, wherein a reflective surface is situated at a fixed position in said reference coordinate system instead of said at least one light emitter and said at least one optical detector situated at a fixed position in said referenced coordinate system, wherein said optical detector, attached to said moving object, detects light reflected from said reflective surface, and wherein said pose processor determines the orientation of said moving object in said reference coordinate system according to the light incident on said optical detector.

21. The system according to claim 20, wherein two additional light emitters are fixed in the vicinity of said reflective surface.

22. The system according to claim 20, wherein another light emitter is fixed in the vicinity of said reflective surface and wherein said another light emitter is of a shape exhibiting no rotational symmetry around an axis normal to the object plane of said light emitter, within a desired range of angles.

23. The system according to claim 20, wherein said reflective surface is a wavelength selective reflective surface, and wherein, said reflective surface is selected from the group consisting of: a mirror; a computer screen; a television screen; a vehicle windshield; and an aircraft windshield.

24. The system according to claim 1, wherein said reference coordinate system moves with respect to another coordinate system.

* * * * *

UNITED STATES PATENT AND TRADEMARK OFFICE
CERTIFICATE OF CORRECTION

PATENT NO.         : 8,384,912 B2                                      Page 1 of 1
APPLICATION NO.    : 12/680514
DATED              : February 26, 2013
INVENTOR(S)        : Adi Charny et al.

It is certified that error appears in the above-identified patent and that said Letters Patent is hereby corrected as shown below:

In the Claims

In column 10 line 61, the phrase "at least one light emitter" should be replaced with the phrase "at least one other light emitter situated in a fixed position";

In column 11 line 6, the phrase "at least one light emitter" should be replaced with the phrase "at least one other light emitter";

In column 11 line 8 and in column 11 lines 11-12, the phrase "at least one two light emitters" should be replaced with the phrase "at least one other light emitter";

In claim 7, the word "said" should be deleted.

Signed and Sealed this
Third Day of December, 2013

Margaret A. Focarino
*Commissioner for Patents of the United States Patent and Trademark Office*

UNITED STATES PATENT AND TRADEMARK OFFICE
CERTIFICATE OF CORRECTION

PATENT NO.        : 8,384,912 B2  
APPLICATION NO.   : 12/680514  
DATED             : February 26, 2013  
INVENTOR(S)       : Adi Charny et al.

Page 1 of 1

It is certified that error appears in the above-identified patent and that said Letters Patent is hereby corrected as shown below:

In the Claims

In column 10 line 61, the phrase "at least one light emitter" should be replaced with the phrase "at least one other light emitter situated in a fixed position";

In column 11 line 6, the phrase "at least one light emitter" should be replaced with the phrase "at least one other light emitter";

In column 11 line 8 and in column 11 lines 11-12, the phrase "at least one two light emitters" should be replaced with the phrase "at least one other light emitter";

In column 11 line 40, in claim 7, the word "said" should be deleted.

This certificate supersedes the Certificate of Correction issued December 3, 2013.

Signed and Sealed this  
Eleventh Day of February, 2014

Michelle K. Lee  
*Deputy Director of the United States Patent and Trademark Office*